417-529
J. Brokenshire,
Ship Pump.
No. 4,110. Reissued Aug. 30. 1870.
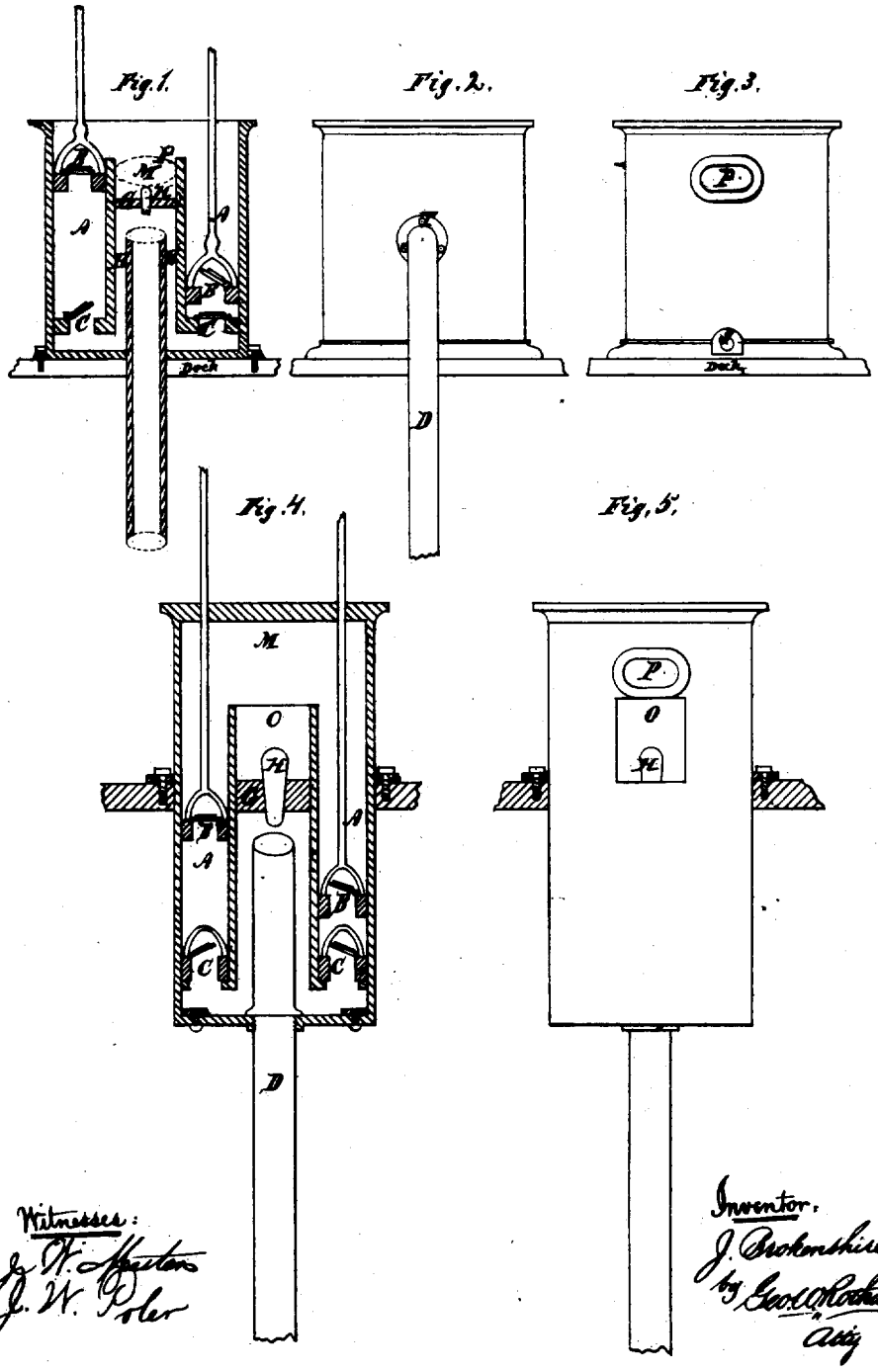
Witnesses:
J. W. Morton
J. W. Poler
Inventor.
J. Brokenshire,
by Geo. H. Rockwell
Atty
N. PETERS, PHOTO-LITHOGRAPHER, WASHINGTON, D. C.

4110

J. Brokenshire.

Reissued Aug 30 1870

Double Acting Ship Pump.

Witnesses:
J. W. Hasten
J. W. Poler

Inventor:
J. Brokenshire,
by Geo. C. Rockwell
Atty

United States Patent Office.

JOHN BROKENSHIRE, FOR HIMSELF, OF KINGSTON, CANADA, AND GEORGE GOBLE AND J. D. MACFARLANE, ASSIGNEES OF JOHN BROKENSHIRE, OF OSWEGO, NEW YORK.

*Letters Patent No.* 80,905, *dated August* 11, 1868; *reissue No.* 3,280, *dated February* 2, 1869; *reissue No.* 4,110, *dated August* 30, 1870.

DIVISION A.

IMPROVEMENT IN PUMPS.

The Schedule referred to in these Letters Patent and making part of the same.

*To all whom it may concern:*

Be it known that I, JOHN BROKENSHIRE, of Kingston, in the county of Frontenac, Province of Ontario and Dominion of Canada, have made certain new and useful Improvements in Ships'-Pumps; and I do hereby declare the following to be a full, clear, and exact description thereof, sufficient to enable those skilled in the art to which my invention appertains to fully understand and to make and use the same, reference being had to the accompanying drawing forming part of this specification, and in which—

Figure 3:
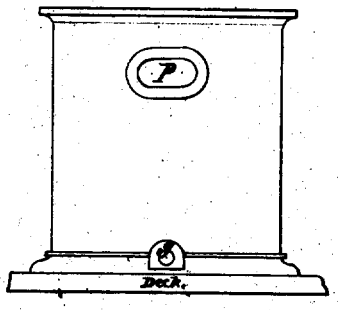
Figure 4:
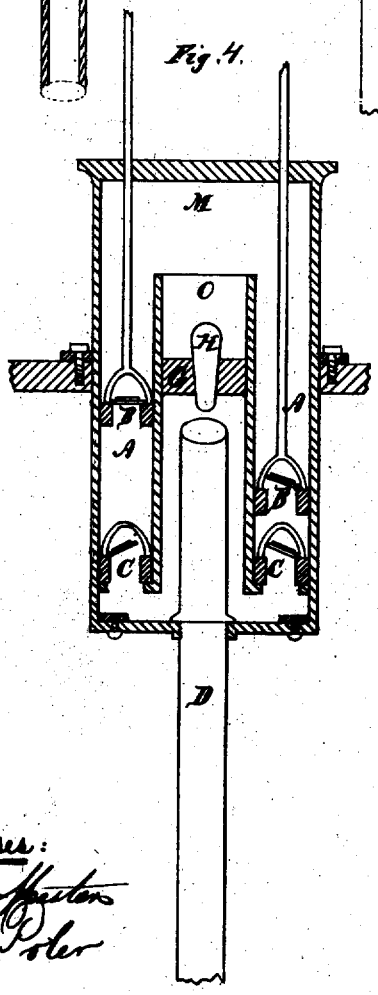
Figure 5:
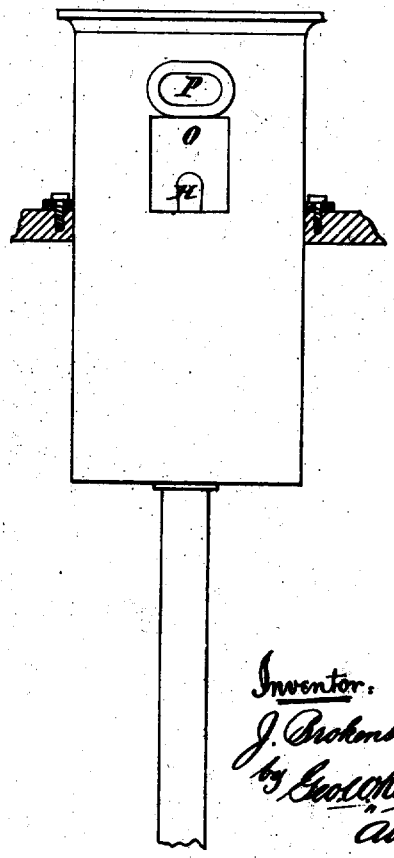

Figure 3, a similar view;

Figure 4, a vertical central section, showing a modification of my invention; and Figure 5 is an elevation of the same.

Similar letters of reference indicate like parts in the several figures.

My invention is an improved double-acting lift or suction-pump for ships.

The invention consists in a chamber arranged centrally between the working barrels, and communicating directly therewith at the bottom, and also in communication with the suction-pipe, and provided with a plug or valve above and in line with the suction-pipe, to allow the sounding of the vessel through said pipe, as hereinafter more fully described.

The invention further consists in the combination of the central chamber, working barrels, plunger provided with valves, stationary valves, a partition separating the discharge-chamber from the chamber below, the discharge-chamber, and a suction-pipe, the lower chamber, barrels, and suction-pipe being in communication with each other, substantially as hereinafter set forth.

Referring to the drawing—

A A represent the working barrels, provided with stationary valves C C at the bottom, and B B are the plungers, also having valves.

Between the barrels is arranged a central chamber, E, communicating at the bottom with the barrels, and also in communication with the suction-pipe.

I prefer to extend this pipe up into the chamber E, so that the water entering from the pipe shall be compelled to descend in said chamber before it can pass through the valves C C to reach the barrels, as a vacuum or partial vacuum is thereby created in the upper part of the chamber, which has a tendency to assist the plungers in elevating the water. This extension of the suction-pipe, which is shown in the drawing, is not, however, indispensable to the successful working of the pump.

Above the chamber E, and separated therefrom by a partition, G, is a space, M, which I term the "discharge-chamber," as the water elevated by the plunger is compelled to pass through it on its way to the discharge-orifice P.

In the partition G, immediately over the suction-pipe, is made an opening, fitted with a valve or plug, H. This serves the double purpose of admitting air to the chamber E, when desired, and permitting the sounding of the well through the suction-pipe, without the removal of any of the working parts of the pump.

Figure 1:
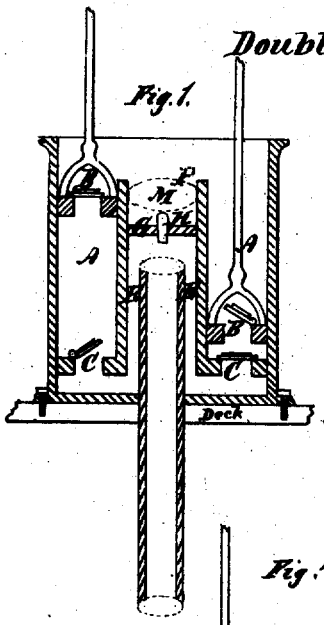
Figure 1 is a central vertical section.
Figure 2:
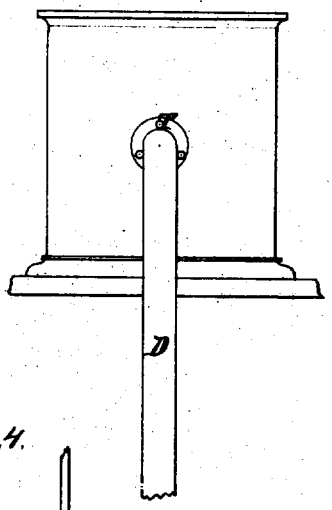
Figure 2 is a side elevation.

In fig. 2 the suction-pipe is shown attached to the side of the pump instead of to the bottom, as in fig. 1, but, as this forms the subject of another division of this reissue, it is considered unnecessary to further describe it here.

S, in fig. 3, represents an opening through which water may be allowed to escape from the pump in winter, to prevent freezing. This opening is provided with a suitable plug.

Figs. 4 and 5 represent the pump as modified to suit deep sea-going vessels. It will be observed that this modification is only different from the pump shown in figs. 1, 2, and 3, in that it extends below as well as above the deck.

I desire to state, that when the pump is of the construction shown in the drawing, I prefer to make it of metal; but, when made of wood, I first form an opening in the side of the log or piece of timber from which the pump is to be made, and then bore the log longitudinally, so as to form the two barrels and an ascending-duct or passsage, all communicating with said opening in the side, which is to be afterward closed by a cover or plate, so as to form a chamber or communication between the barrels and the suction-pipe.

The operation will be readily understood from the foregoing description, without further explanation.

The pump is adapted to hold its own priming, even though the lower valves should be removed.

The barrels, chamber, and suction-pipe being in communication, a constant discharge may be maintained, and the consequent steady flow of the water prevents the pump from being choked with grain, &c. Choking frequently results from momentary stoppages, or the intermittent action of pumps as heretofore constructed.

Having thus described my invention,

What I claim as new, and desire to secure by Letters Patent, is—

1. In ships' lift-pumps, the chamber E arranged between the working barrels, and communicating directly therewith at the bottom, and also in communication with the suction-pipe, and provided with a plug or valve, H, immediately over said pipe, which permits the sounding of the vessel in the manner described.

2. The combination of the central chamber E, barrels A A, plungers B B, having valves, the stationary valves C C, partition G, discharge-chamber M, and a suction-pipe, the chamber E, suction-pipe, and barrels being in direct communication, substantially as described.

JOHN BROKENSHIRE.

Witnesses:

WM. KEEFE,

J. H. GOBLE.